United States Patent
Weinans et al.

(10) Patent No.: US 8,331,848 B2
(45) Date of Patent: Dec. 11, 2012

(54) AUDIO BROADCAST IN A NETWORK

(75) Inventors: Erwin G. H. Weinans, Klijndijk (NL); Tjapko Uildriks, Anderen (NL); Bart B. Trip, Emmen (NL)

(73) Assignee: Sony Ericsson Mobile Communications AB, Lund (SE)

( * ) Notice: Subject to any disclaimer, the term of this patent is extended or adjusted under 35 U.S.C. 154(b) by 903 days.

(21) Appl. No.: 11/362,071

(22) Filed: Feb. 27, 2006

(65) Prior Publication Data

US 2007/0142040 A1 Jun. 21, 2007

Related U.S. Application Data

(60) Provisional application No. 60/750,812, filed on Dec. 16, 2005.

(51) Int. Cl.
*H04H 20/71* (2008.01)

(52) U.S. Cl. ........................ 455/3.01; 455/418; 455/41.2

(58) Field of Classification Search ........ 455/3.01–3.06, 455/418–420, 41.2
See application file for complete search history.

(56) References Cited

U.S. PATENT DOCUMENTS

| | | | | |
|---|---|---|---|---|
| 6,088,730 A * | 7/2000 | Kato et al. | ..................... | 709/227 |
| 6,885,643 B1 * | 4/2005 | Teramoto et al. | ............. | 370/252 |
| 7,224,802 B2 * | 5/2007 | Hosaka | .......................... | 380/274 |
| 7,336,924 B2 * | 2/2008 | Ami et al. | ..................... | 455/41.2 |
| 2004/0064586 A1 * | 4/2004 | Weigand | ....................... | 709/246 |
| 2004/0183903 A1 * | 9/2004 | Pedersen | ....................... | 348/143 |
| 2006/0253693 A1 * | 11/2006 | Kanodia | ........................... | 713/1 |

FOREIGN PATENT DOCUMENTS

| | | |
|---|---|---|
| EP | 1 566 939 A1 | 8/2005 |
| JP | 7131413 A | 5/1995 |
| JP | 2002-152212 A | 5/2002 |
| WO | WO 01/69869 A2 | 9/2001 |
| WO | WO 2004/056052 A2 | 7/2004 |

* cited by examiner

*Primary Examiner* — Vladimir Magloire

(74) *Attorney, Agent, or Firm* — Harrity & Harrity, LLP

(57) ABSTRACT

A wireless communication apparatus and method are provided for operation in a communication network. The wireless communication apparatus comprises a receiver unit operative to receive control data and audio data from an audio gateway; a control unit operative to use the control data to provide a connection between the wireless communication apparatus and the audio gateway for communication of the audio data; and a transmitter unit. The receiver unit is operative to receive from another wireless communication apparatus a request for the control data. The control unit is operative to forward via the transmitter unit the control data to the other wireless communication apparatus in response to the request. The other communication apparatus and a method for requesting the control data are also provided.

8 Claims, 4 Drawing Sheets

AUDIO BROADCAST IN A NETWORK

RELATED APPLICATIONS

This application claims priority under 35 U.S.C. §119 based on U.S. Provisional Application Ser. No. 60/750,812, filed Dec. 16, 2005, the disclosure of which is incorporated herein by reference.

FIELD OF THE INVENTION

The invention relates to a wireless communication apparatus and a method of receiving control data and audio data from an audio gateway and transmitting the control data to another wireless communication apparatus. The invention also relates to a wireless communication apparatus and a method for transmitting a request for control data for enabling reception of audio data communicated between another wireless communication apparatus and an audio gateway.

BACKGROUND

Short-range communication techniques, such as Bluetooth, enable wireless communication between, e.g., a mobile telephone and a headset. For this purpose, two profiles are defined according to the Bluetooth specification: HSP (HeadSet Profile) and HFP (HandsFree Profile). These profiles define the interaction between two Bluetooth enabled devices for the communication of voice and data therebetween. HSP as well as HFP define interaction between only two devices at the time.

During communication of audio data between Bluetooth devices, one takes an AG (Audio Gateway) role and the other an HF (HandsFree) role. For the communication, either HFP or HSP is used. The profile to use may be determined by the initiator to the communication. During connections between the HF device and the AG device, the HF device receives audio data as a stream of data, and control data, such as call status and/or phone status data, as data packets.

The Bluetooth technique does not provide for broadcast of audio data to an unlimited number of devices at the same time. The maximum number of connections for broadcasting the same audio data to HF devices an AG device can handle at the time is limited to three.

Therefore, the possibility of broadcasting audio data using a short-range communication technique, which has a limited possibility to serve multiple receiving devices, is relatively scarce. This makes such a short-range communication technique inflexible, as the number of devices that can be served with broadcast audio data is limited. Thus, very few HF devices may be added to an ad-hoc network having an AG as a master device of the network for broadcasting the audio data.

SUMMARY OF THE INVENTION

According to an embodiment of the invention, a wireless communication apparatus for operation in a communication network comprises a receiver unit operative to receive control data and audio data from an audio gateway; a control unit operative to use the control data to provide a connection between the wireless communication apparatus and the audio gateway for communication of the audio data; and a transmitter unit. The receiver unit is operative to receive from another wireless communication apparatus a request for the control data. The control unit is operative to forward via the transmitter unit the control data to the other wireless communication apparatus in response to the request.

The control unit may be operative to forward the control data to a single other wireless communication apparatus at the time.

The control apparatus may be adapted to disconnect a connection to a first other wireless communication apparatus before a connection to a second other wireless communication apparatus is established.

The control unit may be adapted to discard received audio data.

The wireless communication apparatus may comprise a display. The control unit may be adapted to forward to the display at least a portion of the control data.

According to another embodiment, a wireless communication apparatus for operation in a communication network, comprises a transmitter unit operative to transmit to anther wireless communication, apparatus a request for control, data, which supports communication of audio data between an audio gateway and the other wireless communication apparatus; a receiver unit operative to receive the control data from the other wireless communication apparatus; and a control unit operative to use the control data to control the receiver unit to receive the audio data when communicated between the audio gateway and the other wireless communication apparatus.

The control unit may be operative to use the control data to keep track of a connection for communication of the audio data between the audio gateway and the other wireless communication apparatus.

The control unit may be operative to control the receiver unit to release a connection to the other wireless communication apparatus when the control data has been received.

The control unit may be operative to disable the transmitter unit while the receiver unit is receiving the audio data.

The wireless communication apparatus may be a portable or handheld mobile radio communication equipment, a mobile radio terminal, a mobile telephone, a communicator, an electronic organizer, a headset or a smartphone.

According to another embodiment, a method for providing control data in a communication network performed in a wireless communication apparatus, comprises receiving from an audio gateway control data for a connection for receiving audio data; using the control data to provide a connection between a wireless communication apparatus and the audio gateway for communication of the audio data; receiving from another wireless communication apparatus a request for the control data; and forwarding the control data to the other wireless communication apparatus in response to the request.

The forwarding may comprise forwarding the control data to a single other wireless communication apparatus at the time.

The method for providing control data in a communication network may comprise disconnecting a connection to a first other wireless communication apparatus before a connection to a second other wireless communication apparatus is established.

The method for providing control data in a communication network may comprise forwarding to a display at least a portion of the control data and displaying the portion of the control data.

According to another embodiment, a method for requesting control data in a communication network performed in a wireless communication apparatus comprises transmitting to another wireless communication apparatus a request for control data, which supports communication of audio data between an audio gateway and the other wireless communication apparatus; receiving the control data from the other wireless communication apparatus; and controlling a receiver unit to receive the audio data communicated between the audio gateway and the other wireless communication apparatus.

The method for providing control data in a communication network may comprise using the control data to keep track of a connection for communication of the audio data between the audio gateway and the other wireless communication apparatus.

The controlling may comprise controlling the receiver unit to release a connection to the other wireless communication apparatus when the control data has been received.

According to another embodiment, a computer program product for providing control data in a communication network comprises a computer readable medium having computer readable code embodied therein. The computer readable code comprises computer readable code configured to receive from an audio gateway control data for a connection for receiving audio data; computer readable code configured to use the control data to provide a connection between a wireless communication apparatus and the audio gateway for communication of the audio data; computer readable code configured to receive from another wireless communication apparatus a request for the control data; and computer readable code configured to forward the control data to the other wireless communication apparatus in response to the request.

According to another embodiment, a computer program product for requesting control data in a communication network comprises a computer readable medium having computer readable code embodied therein. The computer readable code comprises computer readable code configured to transmit to another wireless communication apparatus a request for control data, which supports communication of audio data between an audio gateway and the other wireless communication apparatus; computer readable code configured to receive the control data from the other wireless communication apparatus; and computer readable code configured to control a receiver unit to receive the audio data communicated between the audio gateway and the other wireless communication apparatus.

Further embodiments of the invention are defined in the dependent claims.

Some embodiments of the invention allows for providing audio data from a single AG to a plurality of wireless communication apparatuses. In some embodiments this is allowed even if the number of wireless communication apparatuses to be served exceeds the number of wireless communication apparatuses the audio gateway is configured to serve.

BRIEF DESCRIPTION OF THE DRAWINGS

Further objects, features and advantages of embodiments of the invention will appear from the following detailed description, reference being made to the accompanying drawings, in which.

DETAILED DESCRIPTION OF EMBODIMENTS OF THE INVENTION

Figure 1:
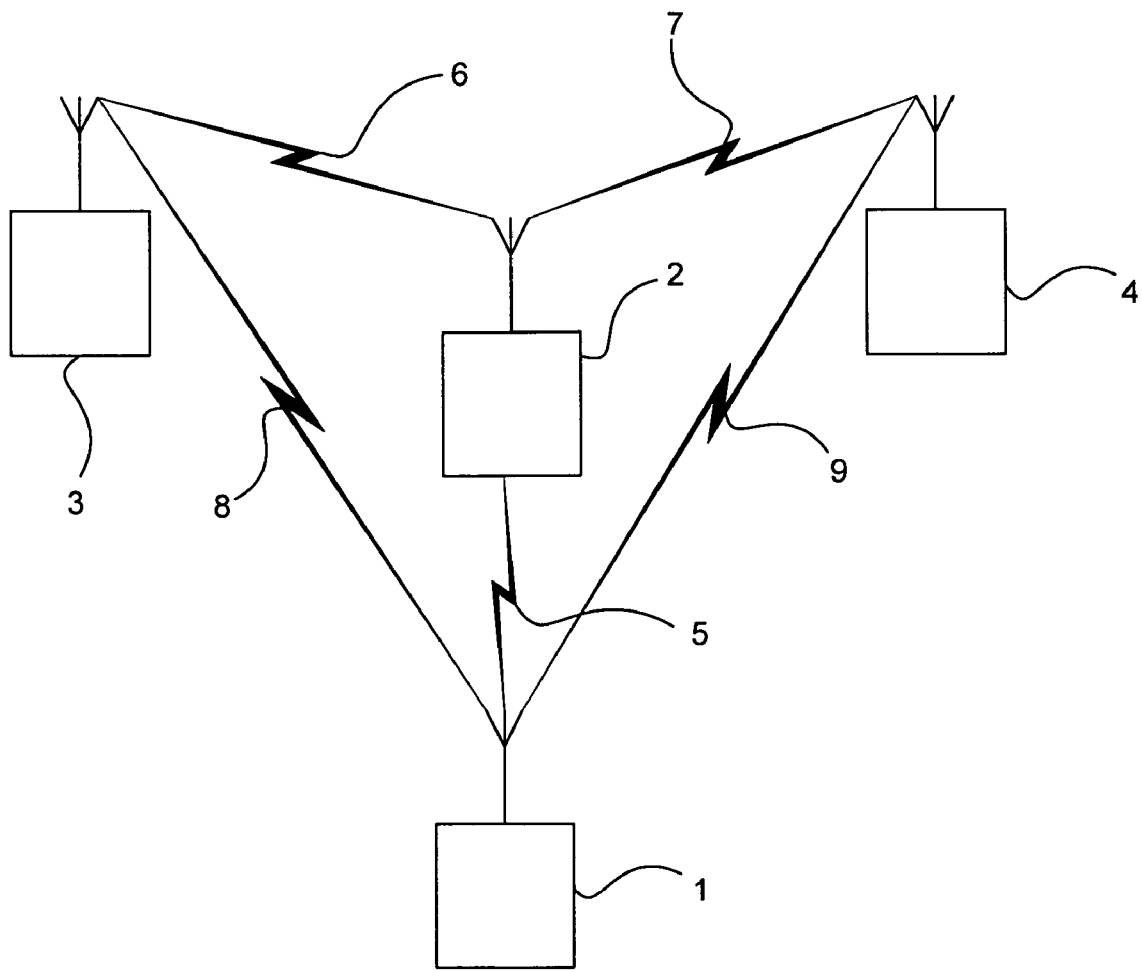
FIG. 1 is a schematic view of a communication network.

Embodiments of the invention will be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 illustrates a communication network according to an embodiment of the invention. An audio gateway (AG) 1, a first wireless communication apparatus 2, a second wireless communication apparatus 3, and a third wireless communication apparatus 4 may be operative in the communication network. The communication network may be a short-range communication network, such as a Bluetooth communication network.

The AG 1 is configured to broadcast audio data to the first wireless communication apparatus 2. The AG 1 is also configured to provide over a first wireless link 5 control data to enable a connection for communication of the audio data between the AG 1 and the first wireless communication apparatus 2. The first wireless communication apparatus 2 is configured to use the received control data to provide the connection for receiving the audio data. Once the connection between the AG 1 and the first wireless communication apparatus 2 is set up, other wireless communication apparatuses may request access to the control data for the connection for the audio data between the AG 1 and the first wireless communication apparatus 2. The request may be transmitted from the second wireless communication apparatus 3 and/or the third wireless communication apparatus 4 to the first wireless communication apparatus 2 over a second link 6 and a third link 7. Then, the first wireless communication apparatus 2 may forward the control data for the connection between the AG 1 and first wireless communication apparatus 2 in response to the request. The second and third wireless communication apparatuses 3, 4 may use the control data to gain access to the first link 5 and thereby receive the audio data communicated between the AG 1 and the first wireless communication apparatus 2. Thus, a fourth link and a fifth link will be established between the AG 1 and the second wireless communication apparatus 3, and between the AG 1 and the third wireless communication apparatus 4.

The AG 1 need only be configured to manage the connection to the first wireless communication apparatus 2. The fourth link 8 and the fifth link 8 need not be managed by the AG 1. The second and the third wireless communication apparatuses 3,4 are adapted to sniff or pick up audio data transmitted between the AG 1 and the first wireless communication apparatus 2 by using the control data. Furthermore, the second and third wireless communication apparatuses 3, 4 need not transmit anything to the AG 1. Thus, the AG 1 does not need to have any knowledge of the second and third wireless communication apparatuses 3, 4. Consequently, the AG 1 need only be configured to broadcast audio data to a single wireless communication apparatus. However, embodiments of the invention allows for broadcasting audio data from a single AG to a plurality of wireless communication apparatuses, even if the number of wireless communication apparatuses to be served exceeds the number of wireless communication apparatuses the AG 1 is configured to serve. This is enabled as control data is forwarded by the first wireless communication apparatus 2 and the audio data is provided between the AG 1 and the first wireless communication apparatus 2. Consequently, other wireless communication apparatuses having the control data may also receive the audio data. If the audio data is not encrypted, the second and third wireless communication apparatuses 3, 4 do not need any information to encrypt the audio data.

The AG 1 is the device providing audio data, e.g., as a stream of audio data. The wireless communication apparatuses 2, 3, 4 may be used to listen to the audio data. The first wireless communication apparatus 2 may be master device. The second and third wireless communication apparatuses 3, 4 may be slave devices operating under control of the master device. The control of the slave devices is provided by the control data for the connection between the AG 1 and the first wireless communication apparatus 2.

Figure 2:
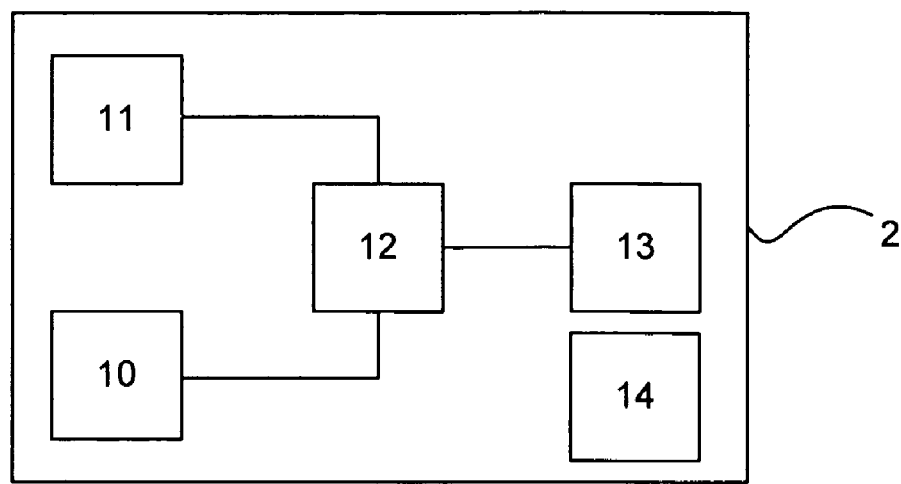
FIG. 2 is a block diagram of a first wireless communication apparatus.

FIG. 2 illustrates some components of an embodiment of the first wireless communication apparatus 2. The first wireless communication apparatus 2 comprises a receiver unit 10, a transmitter unit 11 and a control unit 12. Also, the first wireless communication apparatus 2 may comprise a memory 13.

Receiver unit 10 and transmitter unit 11 may alternatively be provided as a transceiver unit (not shown). Receiver unit 10 and transmitter unit 11 may be provided using a short-range radio access technique, such as Bluetooth.

Receiver unit 10 is operative to receive the control data and the audio data from the AG 1. Control unit 12 is operative to use the control data to provide a connection between the first wireless communication apparatus 2 and the AG 1 for communication of the audio data. Based on the control data, the connection between the first wireless communication apparatus 2 and the AG 1 may be established and maintained.

Receiver unit 11 is operative to receive from another wireless communication apparatus, such as the first and/or second wireless communication apparatus 3, 4, a request for the control data for the connection between the AG 1 and the first wireless communication apparatus 2. Control unit 12 is operative to forward, via transmitter unit 11, the control data to the other wireless communication apparatus in response to the request.

In some embodiments, control unit 12 is operative to forward the control data to a single other wireless communication apparatus at the time. This may be provided by disconnecting a connection to the second wireless communication apparatus 3 before a connection to the third communication apparatus 4 is established. This embodiment may, e.g., be useful if the first wireless communication apparatus may only serve one other wireless communication apparatus with the control data at the time.

In some embodiments, control unit 11, or any other unit in the first wireless communication apparatus 2, is adapted to discard the received audio data. Thus, the first wireless communication apparatus 2 may be provided as a base unit having a relatively fixed position for example in a room. When slave devices enters the area, e.g., radio coverage area, serviced by the first wireless communication apparatus 2, they may request access to the control data. When the control data has been received, audio data from the AG 1 may be received. This provides for setting up of audio broadcast in relatively limited areas, such as at museums, areas of a city, tourist attractions, etc.

The AG 1 and the first wireless communication apparatus 2, to which it is connected, may be co-located or located in relative proximity. Thus, the area service by the AG 1 and the first wireless communication apparatus 2 may be relative uniform. This may be advantageous if several AGs are provided in a larger area, such as at a museum. Then, different AGs may be provided in different rooms and it is assured that the control data may be received anywhere the audio data is available from a single AG.

In one embodiment the first wireless communication apparatus 2 is a portable communication apparatus. The first wireless communication apparatus 2 may be included in or embodied as a wristwatch, carried as a necklace, or simply a handheld device. The second wireless communication apparatus 3 may be a headset 5. The first wireless communication apparatus 2 may be used to monitor, e.g., a call. The second wireless communication apparatus 3 may be used to listen to the audio provided by the AG 1. The control data may comprise call status information, such as phone number of an incoming call. Thus, a portion of the control data, such as the phone number, may be displayed in a display 14 of the first wireless communication apparatus 2. Control unit 12 may be adapted to forward to the display 14 at least a portion of the control data.

Figure 3:
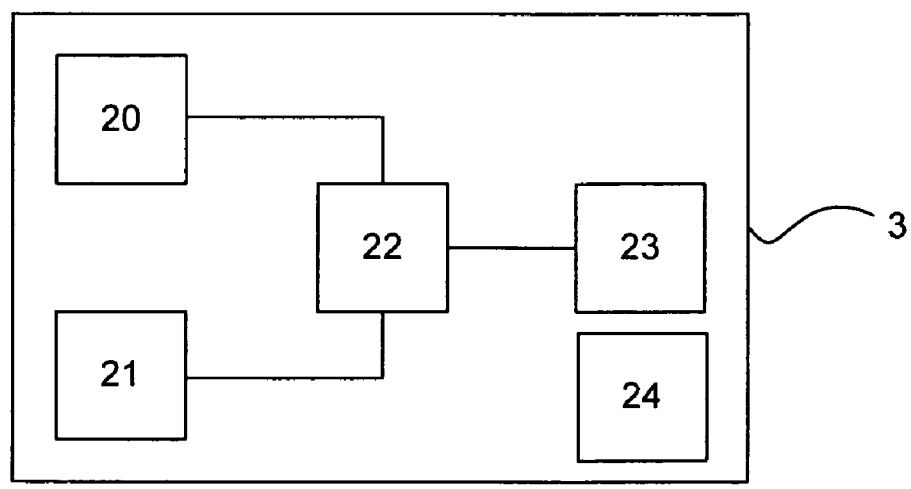
FIG. 3 is a block diagram of a second wireless communication apparatus.

FIG. 3 illustrates some components of an embodiment of the second wireless communication apparatus 3. The third wireless communication apparatus 4 may have the same configuration as the second wireless communication apparatus 3, and will therefore not be described in any further detail. The second wireless communication apparatus 3 comprises a transmitter unit 20, a receiver unit 21 and a control unit 22. The second wireless communication apparatus 3 may also comprise a memory 23.

Transmitter unit 20 and receiver unit 21 may alternatively be provided by a transceiver unit (not shown). Transmitter unit 20 and receiver unit 21 may be provided using a short-range radio access technique, such as Bluetooth.

Transmitter unit 20 is operative to transmit to the first wireless communication apparatus 2 a request for the control data, which supports the communication of the audio data between the AG 1 and the first wireless communication apparatus 2. The control data may be used to keep track or the connection for communicating the audio data.

Receiver unit 21 is operative to receive the control data from the first wireless communication apparatus 2.

Control unit 22 is operative to use the control data to control receiver unit 21 to receive the audio data when communicated between the AG 1 and the first wireless communication apparatus 2.

In some embodiments, control unit 22 is operative to use the control data to keep track of the connection for communication of the audio data between the AG 1 and the first wireless communication apparatus 2. Thus, audio data broadcasted from the AG 1 may be received in the second wireless communication apparatus 3. The audio data may be forwarded to a loudspeaker 24 for rendering.

In some embodiments, control unit 22 is operative to control receiver unit 21 to release a connection to the first wireless communication apparatus 2 when the control data has been received. Thus, the first wireless communication apparatus 2 is free to provide the control data to other wireless communication apparatuses. This enables use of a protocol or profile, which is configured for communication between a first and a second device only, to transmit the control data between the first and the second wireless communication apparatuses 2, 3. For example, the HSP and HFP, which are configured for transmission between only a first and as second device, may be used to communicate the control data. Releasing the connection to the first wireless communication apparatus 2 allows for another wireless communication apparatus to gain access to the control data using the same method.

In some embodiments, control unit 22 is operative to disable transmitter 20 while receiver 21 is receiving the audio data. Thus, the second wireless communication apparatus 3 acts as a slave device. This provides for an unlimited number of wireless communication apparatuses that may listen to the audio data communicated between the AG 1 and the first wireless communication apparatus 2.

Control units 12 and 22 may be implemented by processors, such as CPUs, running software for their functions. The software may e.g. be stored in memories 13 and 23. Alternatively, control units 12 and 22 maybe provided by hardware components, such as ASICs (Application Specific Integrated Circuit) or FPGAs (Field Programmable Gate Array).

The control data may be stored in memories 13 and 23. The control data may comprise information to keep track of the connection between the AG 1 and the first wireless communication apparatus 2. For example, in a frequency hopping network, the control data may, e.g., comprise data to determine a frequency hop sequence. The control data may also comprise other information, such as clock offset, hopping tables, encryption keys, link keys, etc.

Requests and responses to the requests communicated between the first wireless communication apparatus 2 and the second and third wireless communication apparatuses 3, 4, may be provided using for example the AT (Attention command) set, an API (Application Program Interface), one or several binary messages, etc.

In an embodiment, the communication network is a Bluetooth network. Then, the AG 1 may communicate the control data and the audio data using HFP or HSP. The first wireless communication apparatus 2 may receive the control data and the audio data using the protocol (e.g., HFP or HSP) used by the AG 1. The protocol to be used may be selected by the device, which initiated the connection between the AG 1 and the first wireless communication apparatus 2. Thus, the AG 1 may be provided by a standard Bluetooth AG, and will not be further disclosed herein.

The second and third wireless communication apparatuses 3, 4 may be embodied as portable wireless communicator apparatuses. For example, they may be embodied as portable or handheld mobile radio communication equipment, a mobile radio terminal, a mobile telephone, a communicator, an electronic organizer, a headset, or a smartphone.

Figure 4:
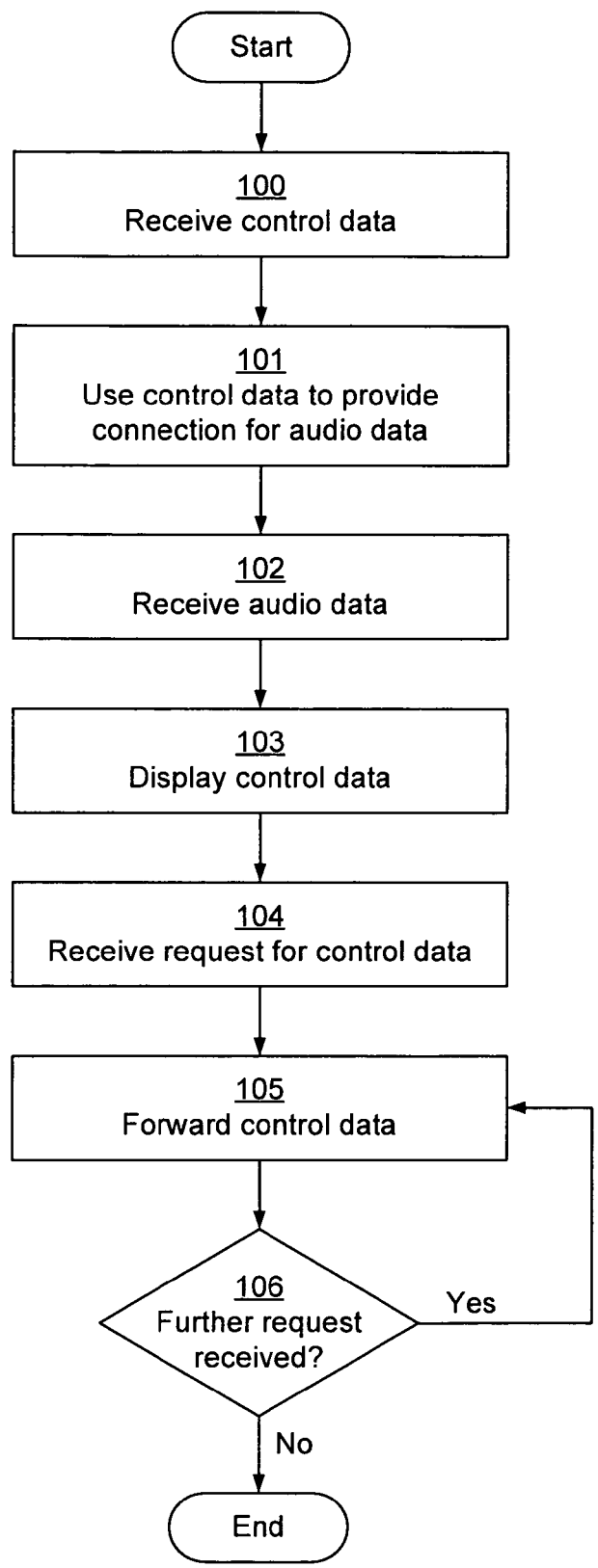
FIG. 4 is a flow-chart of a method for providing control data in a communication network.

FIG. 4 illustrates an embodiment of a method for providing control data in the communication network. In a first step 100 control data for a connection for receiving audio data is received in the first wireless communication apparatus 2. Then, in step 102 the control data is used to provide, such as establish and maintain, a connection between the first wireless communication apparatus 2 and the AG 1 to communicate the audio data. In step 102, the audio data is received. In step 103, at least a portion of the control data is displayed. In step 104, a request for the control data supporting the audio data is received form another wireless communication apparatus. In step 105, the control data is forwarded to the other wireless communication apparatus. In step 106, it is determined whether any further request for the control data has been received. The determination in step 105 may e.g. be made when a connection to the wireless communication apparatus, which has already been served with the control data, has been disconnected. If the answer in step 106 is yes, the procedure returns to step 105. If the answer in step 106 is no, the procedure ends.

Figure 5:
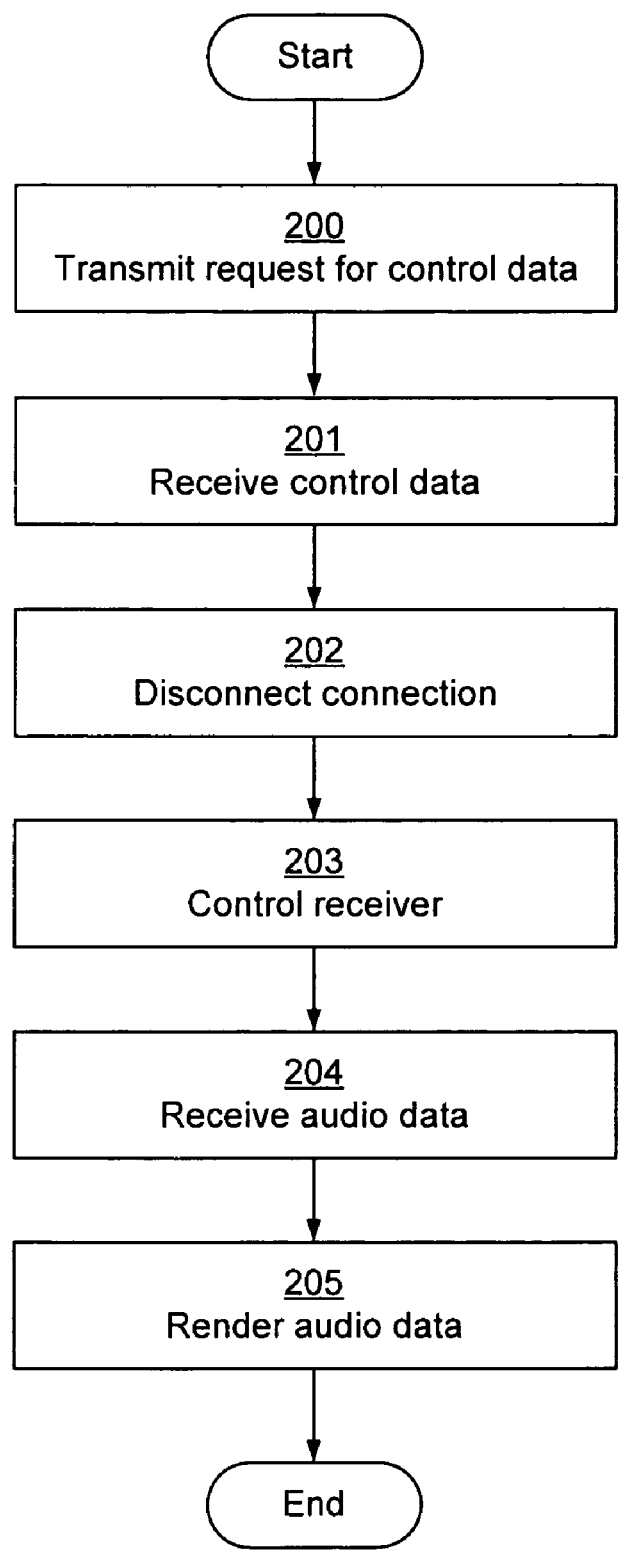
FIG. 5 is a flow-chart of a method for requesting control data in the communication network.

In other embodiments of the method for providing control data, all steps illustrated in FIG. 4 need not be carried out. For example, step 103, and/or step 106 are not carried out in other embodiments. The order of steps illustrated in the embodiment of FIG. 4 may also be carried out in other orders in other embodiments, FIG. 5 illustrates an embodiment of a method for requesting control data in a communication network. The method illustrated in FIG. 5 may, e.g., be carried out in the second and/or third wireless communication apparatuses 3, 4. The control data may be associated with audio data. The audio data and the control data are associated, as the control data supports or enables a connection for communicating the audio data. In a first step 200, a request for control data associated with audio data transmitted between the first wireless communication apparatus 2 and the AG 1 is transmitted. In step 201, the control data is received. In step 202, the connection to the first wireless communication apparatus 2 is released. In step 203, the control data is used to control the receiver 21 to receive the audio data communicated between the first wireless communication apparatus 2 and the AG 1. The controlling may comprise keeping track of the connection for the audio data between the first wireless communication apparatus 2 and the AG 1. The audio data is received in step 204 and rendered in step 205.

In other embodiments of the invention, all steps according to the embodiment of FIG. 5 are not carried out. For example, step 202 is not carried out in other embodiments. The steps illustrated in FIG. 5 may also be performed in other orders in other embodiments.

As have been used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention have been described with reference to a Bluetooth network. In other embodiments, the communication network and the apparatuses operating therein are adapted to operate in a Wireless Local Area Network (WLAN), such as a Wireless Fidelity (WiFi), a Institute of Electrical and Electronics Engineers (IEEE) 802.11 or Worldwide Interoperability for Microwave Access (WiMAX) network.

The present invention may be embodied as a mobile terminal, method or computer program product. Accordingly, the present invention may take the form of an entirely hardware embodiment, a software embodiment or an embodiment combining software and hardware aspects all generally referred to herein as a unit or device. Furthermore, the present invention may take the form of a computer program product. The computer program product may be stored on a computer-usable storage medium having computer-usable program code embodied in the medium. Any suitable computer readable medium may be utilized including hard disks, CD-ROMs, a RAM (Random Access Memory), a ROM (Read Only Memory), a flash memory, optical storage devices, a transmission media such as those supporting the Internet or an intranet, or magnetic storage devices.

Embodiments of the present invention has been described herein with reference to flowchart and/or block diagrams. It will be understood that some or all of the illustrated blocks may be implemented by computer program instructions. These computer program instructions may be provided to a processor of a general purpose computer, special purpose computer, or other programmable data processing apparatus to produce a machine, such that the instructions when executed create means for implementing the functions/acts specified in the flowchart otherwise described.

It is to be understood that the functions/acts noted in the flowchart may occur out of the order noted in the operational illustrations. For example, two blocks shown in succession may in fact be executed substantially concurrently or the blocks may sometimes be executed in the reverse order depending upon the functionality/acts involved. Although some of the diagrams include arrows on communication paths to show a primary direction of communication, it is to be understood that communication may occur in the opposite direction to the depicted arrows.

A computer program product may comprise computer program code portions for executing the method, as described in the description and the claims, for providing control data when the computer program code portions are run by an electronic device having computer capabilities.

A computer readable medium having stored thereon a computer program product may comprise computer program code portions for executing the method, as described in the description and the claims, for providing control data when the computer program code portions are run by an electronic device having computer capabilities.

A computer program product may comprise computer program code portions for executing the method, as described in the description and the claims, for requesting control data when the computer program code portions are run by an electronic device having computer capabilities.

A computer readable medium having stored thereon a computer program product may comprise computer program code portions for executing the method, as described in the description and the claims, for requesting control data when the computer program code portions are run by an electronic device having computer capabilities.

The present invention has been described above with reference to specific embodiments. However, other embodiments than the above described are equally possible within the scope of the invention. The different features and steps of the invention may be combined in other combinations than those described. The scope of the invention is only limited by the appended patent claims.

What is claimed is:

1. A first wireless communication apparatus for operation in a communication network, the first wireless communication apparatus comprising:
   a receiver unit to receive control data and audio data from an audio gateway;
   a control unit to use the control data to provide a wireless link between the first wireless communication apparatus and the audio gateway, for wireless communication of the audio data from the audio gateway to the first communication apparatus; and
   a transmitter unit,
      where the receiver unit is to receive, from another wireless communication apparatus, a request for the control data,
      where the control unit is to forward, via the transmitter unit, the control data to the other wireless communication apparatus, in response to the request, for enabling the other wireless communication apparatus to use the control data to gain access to the wireless link, between the first wireless communication apparatus and the audio gateway, to receive the audio data when communicated between the audio gateway and the first wireless communication apparatus, and
      where the control unit is to disconnect a connection to a first other wireless communication apparatus before a connection to a second other wireless communication apparatus is established.

2. The first wireless communication apparatus according to claim 1, where the control unit is to forward the control data to a single other wireless communication apparatus at a time.

3. The first wireless communication apparatus according to claim 1, where the control unit is to discard received audio data.

4. The first wireless communication apparatus according to claim 1, further comprising a display, where the control unit is to forward to the display at least a portion of the control data.

5. A method for providing control data in a communication network performed in a first wireless communication apparatus, the method comprising:
   receiving, from an audio gateway, control data for a connection for receiving audio data;
   using the control data to provide a wireless link between the first wireless communication apparatus and the audio gateway for wireless communication of the audio data;
   receiving from another wireless communication apparatus a request for the control data;
   forwarding the control data to the other wireless communication apparatus, in response to the request, for enabling the other wireless communication apparatus to use the control data to gain access to the wireless link between the first wireless communication apparatus and the audio gateway to receive the audio data when communicated between the audio gateway and the first wireless communication apparatus; and
   disconnecting a connection to a second wireless communication apparatus before a connection to a third wireless communication apparatus is established.

6. The method according to claim 5, where the forwarding comprises forwarding the control data to a single other wireless communication apparatus at a time.

7. The method according to claim 5, further comprising forwarding to a display at least a portion of the control data and displaying the portion of the control data.

8. One or more devices that store instructions, executable by a processor, to provide control data in a communication network, the instructions comprising:
   one or more instructions to receive, from an audio gateway, control data for a connection for receiving audio data;
   one or more instructions to use the control data to provide a wireless link between a first wireless communication apparatus and the audio gateway for communication of the audio data from the audio gateway to the first communication apparatus;

one or more instructions to receive, from another wireless communication apparatus, a request for the control data;

one or more instructions to forward the control data to the other wireless communication apparatus, in response to the request, for enabling the other wireless communication apparatus to use the control data to gain access to the wireless link between the first wireless communication apparatus and the audio gateway to obtain access to wireless communication of audio data from the audio gateway to the first communication apparatus; and one or more instructions to disconnect a connection to a second wireless communication apparatus before a connection to a third wireless communication apparatus is established.

\* \* \* \* \*